United States Patent
Jiao et al.

(10) Patent No.: US 11,432,232 B2
(45) Date of Patent: Aug. 30, 2022

(54) CONTROL INFORMATION TRANSMISSION METHOD, BASE STATION, AND TERMINAL

(71) Applicant: HUAWEI TECHNOLOGIES CO., LTD., Guangdong (CN)

(72) Inventors: Shurong Jiao, Shanghai (CN); Meng Hua, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/054,623

(22) Filed: Aug. 3, 2018

(65) Prior Publication Data
US 2018/0343611 A1 Nov. 29, 2018

Related U.S. Application Data

(63) Continuation of application No. PCT/CN2016/081928, filed on May 12, 2016.

(30) Foreign Application Priority Data
Feb. 4, 2016 (WO) ................ PCT/CN2016/073546

(51) Int. Cl.
H04W 48/16 (2009.01)
H04W 72/04 (2009.01)
(Continued)

(52) U.S. Cl.
CPC .......... *H04W 48/16* (2013.01); *H04L 1/0071* (2013.01); *H04L 5/0053* (2013.01);
(Continued)

(58) Field of Classification Search
None
See application file for complete search history.

(56) References Cited

U.S. PATENT DOCUMENTS

2008/0159237 A1* 7/2008 Dominique ......... H04W 52/325
370/335
2009/0175231 A1* 7/2009 Seo ....................... H04L 1/0071
370/329
(Continued)

FOREIGN PATENT DOCUMENTS

CN 101911744 A 12/2010
CN 102387588 A 3/2012
(Continued)

OTHER PUBLICATIONS

"Control signaling enhancements for short TTI," 3GPP TSG RAN WG1 Meeting #83, Anaheim, USA, R1-156461, 3rd Generation Partnership Project—Valbonne, France (Nov. 15-22, 2015).
(Continued)

*Primary Examiner* — Kevin C. Harper
*Assistant Examiner* — Derrick V Rose
(74) *Attorney, Agent, or Firm* — Leydig, Voit & Mayer, Ltd.

(57) ABSTRACT

This application provides a control information transmission method, a base station, and a terminal. The method includes: extracting a radio resource from a preset resource block set, and sending control information in a first time period by using the radio resource. The base station includes a processor and a transmitter. The processor is configured to extract a radio resource from a preset resource block set, and the transmitter is configured to send control information in a first time period by using the radio resource. According to the control information transmission method provided in this application, the base station can send the control information in any time period, and the terminal can receive the control information in any time period, thereby shortening a time interval between two control information transmissions.

12 Claims, 7 Drawing Sheets

---

Receive indication information, where the indication information is used to indicate a distribution location of a radio resource — 1101

Determine a target radio resource from a preset resource block set based on an indication of the indication information — 1102

Receive control information in a first time period by using the target radio resource — 1103

(51) Int. Cl.
*H04L 5/00* (2006.01)
*H04W 16/10* (2009.01)
*H04L 1/00* (2006.01)
*H04W 72/12* (2009.01)

(52) U.S. Cl.
CPC ............ *H04L 5/0094* (2013.01); *H04W 16/10* (2013.01); *H04W 72/042* (2013.01); *H04W 72/1205* (2013.01)

(56) References Cited

U.S. PATENT DOCUMENTS

| | | | |
|---|---|---|---|
| 2011/0021228 A1* | 1/2011 | Kim | H04L 5/0053 455/507 |
| 2011/0280201 A1 | 11/2011 | Luo et al. | |
| 2014/0036803 A1* | 2/2014 | Park | H04W 72/042 370/329 |
| 2014/0286292 A1 | 9/2014 | Park | |
| 2015/0110015 A1 | 4/2015 | Dai et al. | |
| 2015/0117354 A1 | 4/2015 | Dai et al. | |
| 2015/0208390 A1 | 7/2015 | Zhao et al. | |
| 2016/0353418 A1 | 12/2016 | Golitschek Edler Von Elbwart et al. | |
| 2017/0149543 A1* | 5/2017 | Ang | H04L 5/0053 |
| 2018/0070244 A1* | 3/2018 | Wu | H04W 72/042 |
| 2018/0332569 A1 | 11/2018 | Golitschek Edler Von Elbwart et al. | |
| 2019/0037554 A1* | 1/2019 | Gao | H04L 5/0055 |
| 2019/0327752 A1* | 10/2019 | Kim | H04W 72/1215 |

FOREIGN PATENT DOCUMENTS

| | | |
|---|---|---|
| CN | 102939786 A | 2/2013 |
| CN | 103199974 A | 7/2013 |
| CN | 103391563 A | 11/2013 |
| CN | 103548407 A | 1/2014 |
| CN | 103748849 A | 4/2014 |
| EP | 2077640 A2 | 7/2009 |
| EP | 2503835 A1 | 9/2012 |
| EP | 2871796 A1 | 5/2015 |
| KR | 20130084115 A | 7/2013 |
| RU | 2013142762 A | 4/2015 |

OTHER PUBLICATIONS

IN/201837027620, Office Action, dated Jul. 29, 2020.
KR/10-2018-7023827, Office Action, dated Nov. 22, 2019.
"UE-specific search space for ePDCCH," 3GPP TSG RAN WG1 Meeting #68bis, Jeju, Korea, R1-120998, pp. 1-5, 3rd Generation Partnership Project, Valbonne, France (Mar. 26-30, 2012).

* cited by examiner

CONTROL INFORMATION TRANSMISSION METHOD, BASE STATION, AND TERMINAL

CROSS-REFERENCE TO RELATED APPLICATIONS

This application is a continuation of International Application No. PCT/CN2016/081928, filed on May 12, 2016, which claims priority to International Application No. PCT/CN2016/073546, filed on Feb. 4, 2016, The disclosures of the aforementioned applications are hereby incorporated by reference in their entireties.

TECHNICAL FIELD

The present invention relates to the field of mobile communications, and in particular, to a control information transmission method, a base station, and a terminal.

BACKGROUND

With continuous development of mobile communications technologies, a user poses an increasingly high requirement on a speed of data transmission between a base station and a terminal. To increase a data transmission speed, a transmission time interval (TTI) is shortened to increase acknowledgement (ACK) feedback and data retransmission speeds in a data transmission process, and reduce an end-to-end latency in data transmission.

In an existing Long Term Evolution (LTE) system, when sending data to a terminal, a base station fixedly uses first N orthogonal frequency division multiplexing (OFDM) symbols of each subframe to send control information. After obtaining all symbols included in one subframe, the terminal performs demodulation and decoding operations on the subframe, and then determines ACK content based on a demodulation and decoding result. The ACK content may be to retransmit the control information or transmit next control information. After determining the ACK content, the terminal feeds back the ACK to the base station in a subframe. After the base station receives the subframe including the ACK, the base station retransmits the control information or transmits the next control information in a next subframe based on feedback content of the ACK.

Transmission of the control information and transmission of the ACK each require one subframe, and it also takes some time for the base station and the terminal to parse the subframe. Therefore, after sending one piece of control information, the base station can determine, only after a plurality of subframes, whether to retransmit the control information or transmit next control information. A time interval between two control information transmissions is relatively long. The relatively long time interval between two control information transmissions causes a relatively large end-to-end latency in a data transmission process.

SUMMARY

Embodiments of the present invention provide a control information transmission method, a base station, and a terminal, to reduce an end-to-end latency in a data transmission process.

According to a first aspect, this application provides a control information transmission method. The method includes: extracting a radio resource from a preset resource block set, and sending control information in a first time period by using the radio resource. According to the control information transmission method provided in this aspect, the control information can be sent in any time period, so that a time interval between two control information transmissions can be shortened.

With reference to the first aspect, in a first possible implementation of the first aspect, the resource block set includes a plurality of physical resource blocks corresponding to a downlink transmission bandwidth; and the extracting a radio resource from a preset resource block set includes: extracting at least one physical resource block from the plurality of physical resource blocks corresponding to the downlink transmission bandwidth; and determining the radio resource based on the at least one physical resource block. According to this implementation, the radio resource can be extracted flexibly.

With reference to the first possible implementation of the first aspect, in a second possible implementation of the first aspect, the extracting at least one physical resource block from the plurality of physical resource blocks corresponding to the downlink transmission bandwidth includes: separately extracting a group of available resources from two ends of the plurality of physical resource blocks corresponding to the downlink transmission bandwidth, where each group of available resources includes at least one physical resource block. This implementation can prevent control information transmission from being affected by centralized distribution of radio resources in frequency domain.

With reference to the first possible implementation of the first aspect, in a third possible implementation of the first aspect, the extracting at least one physical resource block from the plurality of physical resource blocks corresponding to the downlink transmission bandwidth includes: when the downlink transmission bandwidth includes at least one available subband that is used to send the control information, separately extracting a group of available resources from at least some of available subbands, where each group of available resources includes at least one physical resource block. According to this implementation, radio resources can be distributed evenly in frequency domain, thereby preventing control information transmission from being affected by centralized distribution of the radio resources.

With reference to the second possible implementation of the first aspect or the third possible implementation of the first aspect, in a fourth possible implementation of the first aspect, the determining the radio resource based on the at least one physical resource block includes: sequentially cascading, in a frequency order, physical resource blocks included in the groups of available resources to obtain the radio resource; or sequentially extracting physical resource blocks from the groups of available resources, and cascading the physical resource blocks to obtain the radio resource. According to this implementation, the radio resource can be used more conveniently.

With reference to the second possible implementation of the first aspect, in a fifth possible implementation of the first aspect, the determining the radio resource based on the at least one physical resource block includes: extracting a physical resource block alternately from the groups of available resources, and cascading extracted physical resource blocks to obtain the radio resource, where the physical resource blocks are extracted from one group of available resources in descending order of frequency, and extracted from the other group of available resource in ascending order of frequency. When the physical resource blocks are cascaded in this manner, the control information can be distributed evenly in frequency domain.

With reference to the first aspect, in a sixth possible implementation of the first aspect, the resource block set is a set of a plurality of virtual resource blocks, where each virtual resource block is corresponding to one physical resource block, and extracting, from the resource block set, the radio resource used to send the control information in the first time period includes: extracting a predetermined quantity of virtual resource blocks from the set of the plurality of virtual resource blocks; determining, based on a mapping relationship between a virtual resource block in the resource block set and a physical resource block, physical resource blocks corresponding to all of the predetermined quantity of virtual resource blocks; and cascading, in an order of the virtual resource blocks, the physical resource blocks corresponding to all of the predetermined quantity of the virtual resource blocks, to obtain the radio resource. According to this implementation, radio resources can be distributed quite evenly in frequency domain.

With reference to the sixth possible implementation of the first aspect, in a seventh possible implementation of the first aspect, the extracting a predetermined quantity of virtual resource blocks includes: extracting, in ascending or descending order of virtual resource block numbers, M virtual resource blocks, starting from a predetermined location, where M is a positive integer not less than 1. According to this implementation, a process of extracting the virtual resource is simple.

With reference to the sixth possible implementation of the first aspect, in an eighth possible implementation of the first aspect, the extracting a predetermined quantity of virtual resource blocks includes: when the virtual resource blocks in the resource block set are corresponding to a plurality of interleaving units, extracting at least one virtual resource block from each interleaving unit. According to this implementation, radio resources can be distributed quite evenly in frequency domain.

With reference to the eighth possible implementation of the first aspect, in a ninth possible implementation of the first aspect, the extracting at least one virtual resource block from each interleaving unit includes: extracting, in ascending or descending order of virtual resource block numbers, M virtual resource blocks, starting from a predetermined location of each interleaving unit, where M is a positive integer not less than 1. According to this implementation, a process of extracting the virtual resource block becomes simple when there is the interleaving unit.

With reference to any one of the first aspect or the first to the ninth possible implementations of the first aspect, in a tenth possible implementation of the first aspect, the sending control information in a first time period by using the radio resource includes: when the control information includes a plurality of pieces of sub-information, dividing the radio resource into a predetermined quantity of sub-resources, where each sub-resource includes a resource element group extracted from the physical resource block included in the radio resource, and the predetermined quantity is greater than or equal to a quantity of the plurality of pieces of sub-information; and send one of the plurality of pieces of sub-information in the first time period by using one of the predetermined quantity of sub-resources. According to this implementation, the sub-information can be distributed evenly in frequency domain.

With reference to any one of the first aspect or the first to the ninth possible implementations of the first aspect, in an eleventh possible implementation of the first aspect, the sending control information in a first time period by using the radio resource includes: generating an information sequence, where the information sequence includes the control information; performing scrambling and modulation on the information sequence to obtain a constellation point symbol stream; performing interleaving on the constellation point symbol stream to obtain an interleaved constellation point symbol stream; and mapping the interleaved constellation point symbol stream onto the radio resource for sending in the first time period. According to this implementation, the sub-information can be distributed evenly in frequency domain.

With reference to any one of the first aspect or the first to the eleventh possible implementations of the first aspect, in a twelfth possible implementation of the first aspect, before the sending control information in a first time period by using the radio resource, the method further includes: generating indication information used to indicate a distribution location of the radio resource, and sending the indication information.

With reference to the twelfth possible implementation of the first aspect, in a thirteenth possible implementation of the first aspect, the sending the indication information, where the indication information is used to indicate a distribution location of the radio resource includes: sending the indication information in the first time period by using a predetermined resource; or sending the indication information on a control channel by using common downlink control information DCI; or sending the indication information by using higher layer signaling. According to this implementation, the indication information can be sent in a plurality of possible manners, facilitating a terminal to receive the control information. The indication information may be further used to indicate that the control information is not sent in the first time period, so that the terminal may not perform detection on the control information in the first time period, thereby implementing power saving.

With reference to any one of the first aspect or the first to the thirteenth possible implementations of the first aspect, in a fourteenth possible implementation of the first aspect, the method further includes: sending, in a second time period, user data information scheduled by using the control information. According to this implementation, the user data information can be further sent.

With reference to the fourteenth possible implementation of the first aspect, in a fifteenth possible implementation of the first aspect, the sending user data information scheduled by using the control information includes: determining, based on the control information, a first sending resource used to send the user data information; and sending the user data information by using a radio resource, which can be used to send first control information and is not occupied by the first control information, in the first sending resource, without using a radio resource, which can be used to send second control information, in the first sending resource. According to this implementation, the control information can be adjacent to the user data information in frequency domain, so that the receiving device receives user data conveniently. The first control information is used to schedule downlink user data, and the second control information is used to schedule uplink user data.

With reference to the fourteenth possible implementation of the first aspect, in a sixteenth possible implementation of the first aspect, the sending user data information scheduled by using the control information includes: when a physical resource block occupied for sending the control information belongs to a first subband, transmitting, by using the first subband, the user data information corresponding to the control information, or transmitting, by using the first subband and a subband adjacent to the first subband, the user data information corresponding to the control information. According to this implementation, the control information can be adjacent to the user data information in frequency domain, so that the receiving device receives user data conveniently.

According to a second aspect, this application further provides a data receiving method. The method includes: receiving indication information, where the indication information is used to indicate a distribution location of a radio resource; determining a target radio resource from a preset resource block set based on an indication of the indication information; and receiving the control information in a first time period by using the target radio resource. According to this aspect, a terminal can receive control information sent by a base station in any time period, so that an end-to-end latency in control information transmission can be reduced.

With reference to the second aspect, in a first possible implementation of the second aspect, the resource block set includes a plurality of physical resource blocks corresponding to a downlink transmission bandwidth; and the determining a target radio resource from a preset resource block set based on an indication of the indication information includes: extracting, based on the location indicated by the indication information, a specified quantity of physical resource blocks from a plurality of physical resource blocks corresponding to the downlink transmission bandwidth; and cascading the physical resource blocks in a cascade manner indicated by the indication information, to obtain the radio resource.

With reference to the second aspect, in a second possible implementation of the second aspect, the resource block set is a set of a plurality of virtual resource blocks, where each virtual resource block is corresponding to one physical resource block; and the determining a target radio resource from a preset resource block set based on an indication of the indication information includes: extracting, based on the location indicated by the indication information, a predetermined quantity of virtual resource blocks from the plurality of virtual resource blocks included in the resource block set; and determining a physical resource corresponding to the predetermined quantity of virtual resource blocks as the radio resource.

With reference to any one of the second aspect or the first or the second possible implementation of the second aspect, in a third possible implementation of the second aspect, the receiving control information by using the target radio resource includes: determining a common search space in the target radio resource; and receiving control information of a terminal by performing blind detection on the common search space.

With reference to the third possible implementation of the second aspect, in a fourth possible implementation of the second aspect, the determining a common search space in the target radio resource includes: determining, as the common search space, X consecutive physical resource blocks starting from a minimum-index resource or a maximum-index resource in the target radio resource, where X is a positive integer not less than 1.

With reference to any one of the second aspect or the first or the second possible implementation of the second aspect, in a fifth possible implementation of the second aspect, the receiving control information by using the target radio resource includes: determining a UE-specific search space in the target radio resource; and receiving control information of a terminal by performing blind detection on the UE-specific search space.

With reference to the fifth possible implementation of the second aspect, in a sixth possible implementation of the second aspect, the determining a UE-specific search space in the target radio resource includes: determining, as the UE-specific search space, Y consecutive resource blocks starting from an $a^{th}$ resource block of the target radio resource, where a is obtained based on a terminal identity (UE id), a is a natural number, and Y is a positive integer not less than 1.

With reference to any one of the second aspect or the first to the sixth possible implementations of the second aspect, in a seventh possible implementation of the second aspect, the method further includes: receiving user data information sent by a base station.

With reference to the seventh possible implementation of the second aspect, in an eighth possible implementation of the second aspect, the receiving user data information sent by the base station includes: determining, based on the control information, a first sending resource used to send the user data information; and receiving the user data information by using a radio resource, which can be used to send first scheduling control information and is not occupied by the first scheduling control information, in the first sending resource, without using a radio resource, which can be used to send second scheduling control information, in the first sending resource.

With reference to the eighth possible implementation of the second aspect, in a ninth possible implementation of the second aspect, the receiving user data information sent by the base station includes: receiving the user data information on a subband to which the radio resource used to send the control information belongs; or receiving the user data information on a subband to which the radio resource used to send the control information belongs and on an adjacent subband.

According to a third aspect, this application provides a control information transmission apparatus. The apparatus includes units configured to perform the method steps in the first aspect or the various implementations of the first aspect.

According to a fourth aspect, this application further provides another control information transmission apparatus. The apparatus includes units configured to perform the method steps in the second aspect or the various implementations of the second aspect.

According to a fifth aspect, this application further provides a base station. The base station includes a processor and a transmitter. The processor is configured to extract, from a resource block set according to a predetermined extraction rule, a radio resource used to send control information in a first time period. The transmitter is configured to send the control information in the first time period by using the radio resource.

With reference to the fifth aspect, in a first possible implementation of the fifth aspect, the processor and the transmitter may be further configured to perform corresponding method steps in the implementations of the first aspect.

According to a sixth aspect, this application further provides a terminal. The terminal includes a processor and a receiver. The processor is configured to extract, from a resource block set according to a predetermined extraction rule, a radio resource used to send control information in a first time period. The receiver is configured to receive, based on the radio resource, the control information sent by a base station in the first time period.

With reference to the sixth aspect, in a first possible implementation of the sixth aspect, the processor and the receiver are further configured to perform corresponding method steps in the implementations of the second aspect.

According to the control information transmission method, the base station, and the terminal provided in this application, an end-to-end latency in control information transmission can be reduced.

BRIEF DESCRIPTION OF DRAWINGS

To describe the embodiments of the present invention more clearly, the following briefly describes the accompanying drawings required for describing the embodiments. Apparently, a person of ordinary skill in the art may still derive other drawings from these accompanying drawings without creative efforts.

DESCRIPTION OF EMBODIMENTS

Figure 1:
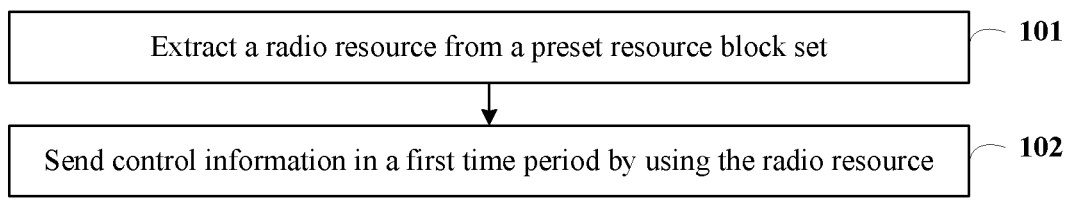
FIG. 1 is a flowchart of a control information transmission method according to an embodiment of this application.

In the embodiments of this application, a base station may include a NodeB (NodeB), an evolved NodeB (eNodeB), or the like. A terminal may include a mobile station (MS), user equipment (UE), or the like. A network side device may include a NodeB, an eNodeB, a base transceiver station (BTS), a radio network controller (RNC), a base station controller (BSC), or the like.

In the embodiments of this application, a first time period is a time period in which control information can be sent within a TTI. In addition to the first time period, the TTI may further include a second time period in which user data information is sent and another time period. In each TTI, the first time period may be an earliest time period in the entire TTI, and the second time period is not earlier than the first time period. For example, when the TTI includes at least one OFDM symbol, the first time period may be at least one OFDM symbol in the TTI. If there is the second time period in the TTI, the second time period may be an OFDM symbol corresponding to the first time period and one or more OFDM symbols corresponding to a time period later than the first time period, or the second time period may be one or more OFDM symbols corresponding to a time period later than the first time period.

In the embodiments of this application, a resource block set may be a set including at least one physical resource block or at least one virtual resource block. For example, the resource block set may be a plurality of physical resource blocks corresponding to a downlink transmission bandwidth, or a plurality of virtual resource blocks corresponding to a downlink transmission bandwidth. The physical resource block is a combination of a group of physical resources in a time dimension and in a frequency dimension. The physical resource block may be a physical resource block including several symbols in a time dimension and several subcarriers in a frequency dimension. For example, the physical resource block may be a physical resource block (PRB) or a physical resource block group (PRBG) in an LTE system. The virtual resource block is a logical concept corresponding to the physical resource block. A size of a physical resource occupied by each virtual resource block is the same as the physical resource block, but an index number of the virtual resource block is a logical number that is unrelated to an actual physical distribution location. For example, the virtual resource block may be a virtual resource block (VRB) or a virtual resource block group (VRBG) in an LTE system. The virtual resource block may be a VRB in a distributed virtual resource block (DVRB) or a VRB in a localized virtual resource block (LVRB). It should be noted herein that, the physical resource block in the embodiments of this application may be a physical resource in any radio communications system, and does not specifically mean the PRB in the LTE system; the virtual resource block may be a virtual resource in any radio communications system, and does not specifically mean the VRB in the LTE system.

Referring to FIG. 1, FIG. 1 is a schematic flowchart of an embodiment of a control information transmission method according to this application. The method shown in this embodiment may be executed by a base station.

Step 101: Extract a radio resource from a preset resource block set.

Before sending control information, the base station may first extract, from the resource block set according to a predetermined extraction rule, a radio resource used to send the control information in a first time period. A resource block included in the resource block set may be a physical resource block or a virtual resource block. The control information may be information used to control downlink user data transmission. For example, the resource block set may be a plurality of physical resource blocks corresponding to a downlink transmission bandwidth; or may be a set of a plurality of virtual resource blocks, where each virtual resource block is corresponding to one physical resource block.

The control information may be corresponding to only one terminal, and is used to control transmission of user data information of the terminal. Alternatively, the control information may include a plurality of pieces of sub-information, and each piece of sub-information is corresponding to one terminal and is used to control transmission of user data of the terminal.

Depending on actual requirements, a plurality of extraction rules may be used to extract the radio resource from the resource block set.

A downlink transmission bandwidth that is used by the base station to send data includes at least one physical resource block. Therefore, when determining the radio resource, the base station may use the physical resource block corresponding to the downlink transmission bandwidth as a resource block set. The base station first extracts at least one physical resource block from the plurality of physical resource blocks corresponding the downlink transmission bandwidth, and then determines the radio resource based on the physical resource block. The extraction rule used to extract the physical resource block by the base station, a determining rule used to determine the radio resource by the base station, and a quantity of time domain resources and a quantity of frequency domain resources that are included in each physical resource block may be all specified in advance by a protocol or delivered by a network side device.

The base station may extract an available resource in different extraction manners according to different extraction rules.

Optionally, the base station may separately extract a group of available resources from two ends of the plurality of physical resource blocks corresponding to the downlink transmission bandwidth. Each group of available resources includes at least one physical resource block.

Figure 2:
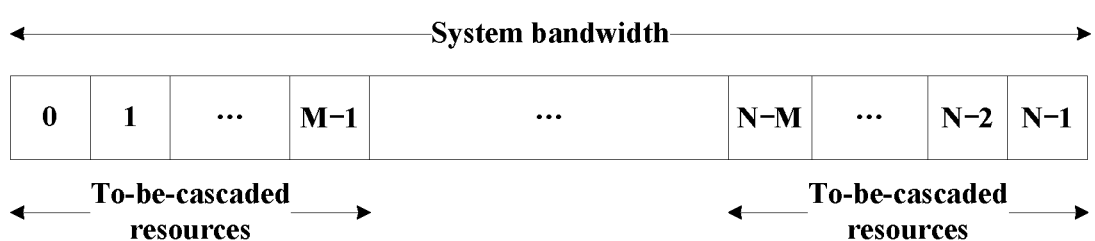
FIG. 2 is a schematic diagram of a manner of extracting an available resource according to an embodiment of this application.

As shown in FIG. 2, when the downlink transmission bandwidth includes N physical resource blocks numbered from 0 to N−1, the base station may extract M physical resource blocks from each of the two ends of the downlink transmission bandwidth as a group of available resources. In other words, physical resource blocks numbered from 0 to M−1 and physical resource blocks numbered from N−M to N−1 may be extracted. Both N and M are positive integers, and N≥M≥2. A value of N is determined based on the downlink transmission bandwidth of the base station, and a value of M may be specified in advance by a protocol or may be delivered by a network side device. Generally, the value of M may be less than or equal to half of the value of N.

Optionally, when the downlink transmission bandwidth includes at least one available subband that is used to send the control information, a group of available resources is separately extracted from at least some of available subbands. Each group of available resources includes at least one physical resource block.

Figure 3:
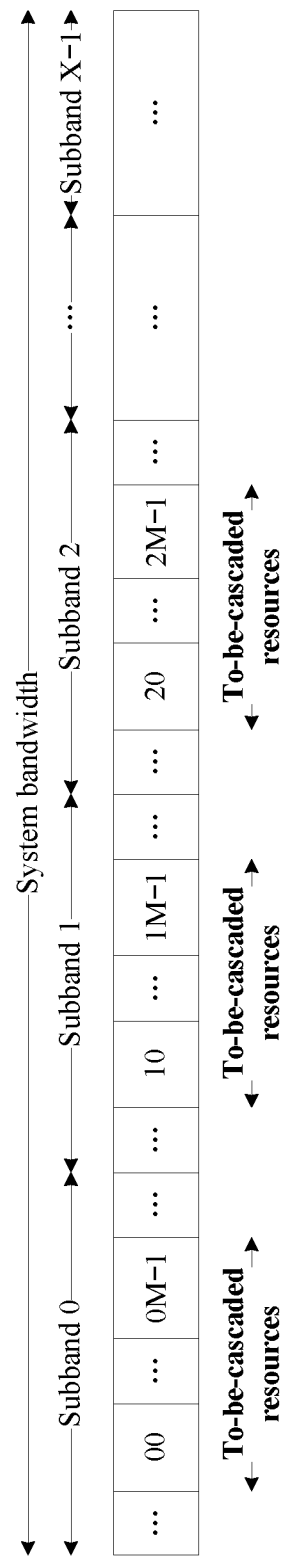
FIG. 3 is a schematic diagram of another manner of extracting an available resource according to an embodiment of this application.

As shown in FIG. 3, when the downlink transmission bandwidth includes X available subbands (subband) numbered from 0 to X−1, and each available subband includes N physical resource blocks, where X is a positive integer, and X≥1, the base station may separately extract M physical resource blocks from some of the available subbands as a group of available resources, or may extract M physical resource blocks from each available subband as a group of available resources. M≤N, and a value of M may be specified in advance by a protocol or may be delivered by a network side device. The available subbands may be all subbands of the downlink transmission bandwidth, or only some subbands of the downlink transmission bandwidth.

When extracting a physical resource block from an available subband, the base station may use any one physical resource block as a start location, and extract M consecutively numbered physical resource blocks. A number of the physical resource block used as the start location and the value of M may be specified in advance by the protocol or may be delivered by the network side device.

It should be noted herein that, after extracting an available resource from an available subband, the base station may send data information by using another resource in the available subband or a resource included in several subbands adjacent to the available subband. Further, when an available resource extracted from an available subband is used to send control information of a terminal, another resource in the available subband and a resource included in several subbands adjacent to the available subband may be used to send data information of the terminal.

After extracting the available resource, the base station may determine the radio resource based on the available resource according to a predetermined determining rule.

The base station may directly use the physical resource blocks as the radio resource, or may cascade the physical resource blocks to obtain the radio resource.

Figure 4:
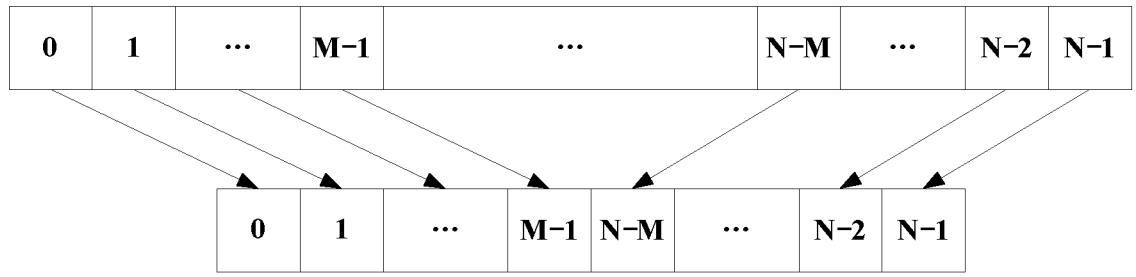
FIG. 4 is a schematic diagram of an available-resource cascade manner according to an embodiment of this application.
Figure 5:
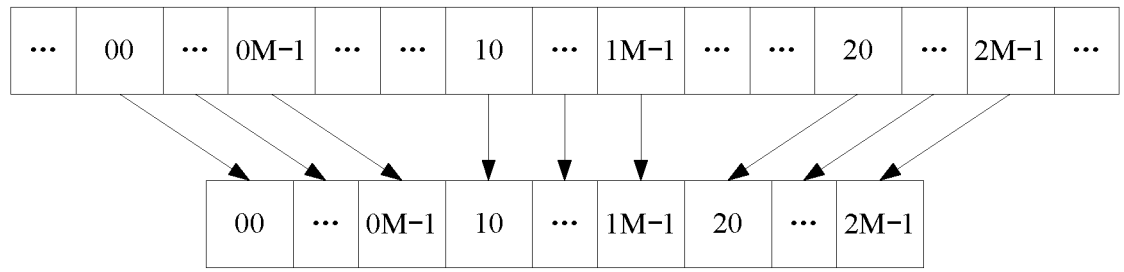
FIG. 5 is a schematic diagram of another available-resource cascade manner according to an embodiment of this application.

Optionally, the base station may sequentially cascade, in ascending or descending order of frequency, physical resource blocks included in each group of available resources to obtain the radio resource. As shown in FIG. 4, when the available resources are extracted from the two ends of the downlink transmission bandwidth, the base station may sequentially cascade, in a frequency order, RBs numbered from 0 to M−1 and RBs numbered from N−M to N−1. As shown in FIG. 5, when the available resources are extracted from the subbands, the base station may also sequentially cascade, in a frequency order, RBs numbered from 00 to 0M−1, RBs numbered from 10 to 1M−1, and RBs numbered from 20 to 2M−1.

Figure 6:
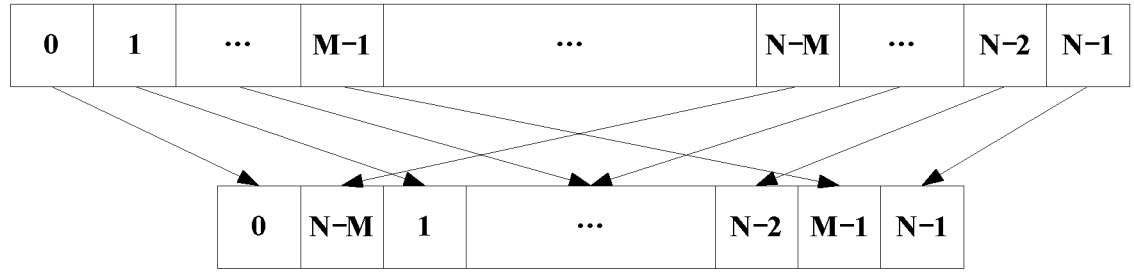
FIG. 6 is a schematic diagram of another available-resource cascade manner according to an embodiment of this application.
Figure 7:
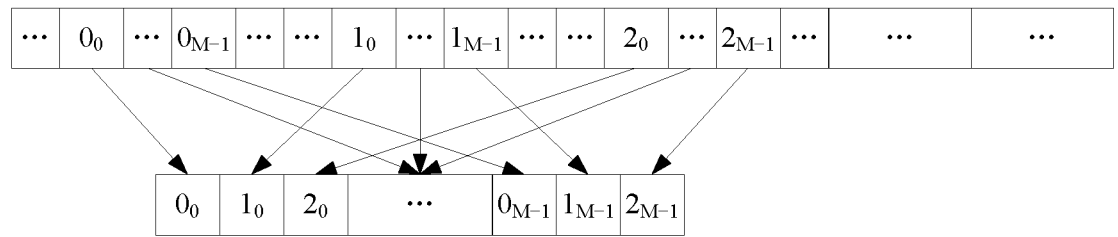
FIG. 7 is a schematic diagram of another available-resource cascade manner according to an embodiment of this application.

Optionally, the base station may sequentially extract a physical resource block from each group of available resources, and sequentially cascade extracted physical resource blocks to obtain the radio resource. As shown in FIG. 6, when the available resources are extracted from the two ends of the downlink transmission bandwidth, the base station may sequentially cascade physical resource blocks numbered 0, N−M, 1, . . . , N−2, M−1, and N−1. As shown in FIG. 7, when the available resources are extracted from the subbands, the base station may also sequentially cascade physical resource blocks numbered $0_0$, $1_0$, $2_0$, . . . , $0_{M-1}$, $1_{M-1}$, and $2_{M-1}$.

Figure 8:
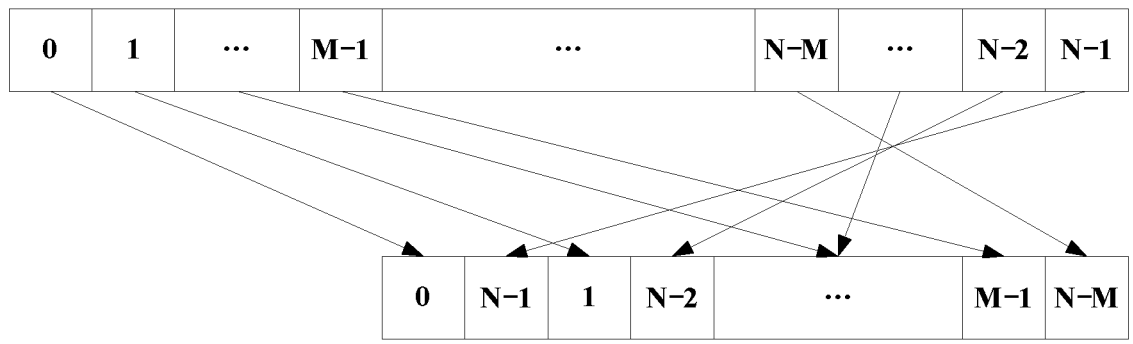
FIG. 8 is a schematic diagram of another available-resource cascade manner according to an embodiment of this application.

When the available resources are extracted from the two ends of the downlink transmission bandwidth, the base station may extract one physical resource block alternately from both groups of available resources, and cascade extracted physical resource blocks to obtain the radio resource. The physical resource blocks are extracted from one group of available resources in descending order of frequency, and are extracted from the other group of available resources in ascending order of frequency. As shown in FIG. 8, when the available resource is extracted from the two ends of the downlink transmission bandwidth, the base station may extract a physical resource block from one group of available resources in a frequency order, extract a physical resource block from the other group of available resources in descending order, and sequentially cascade extracted physical resource blocks, so that the physical resource blocks numbered 0, N−1, 1, N−2, . . . , M−1, and N−M are cascaded sequentially.

The downlink transmission bandwidth may be a logical downlink transmission bandwidth constituted by virtual resource blocks. The virtual resource block in the downlink transmission bandwidth may be classified as a distributed virtual resource block or a localized virtual resource block.

The subband described in this embodiment of this application may be a subband obtained from the distributed virtual resource block or a subband obtained from the localized virtual resource block.

When determining the radio resource, the base station may first extract a predetermined quantity of virtual resource blocks; and determine, based on a mapping relationship between a virtual resource block in the resource block set and a physical resource block in the resource block set, physical resource blocks corresponding to all of the predetermined quantity of virtual resource blocks. The base station may directly use the physical resource block corresponding to the predetermined quantity of virtual resource blocks as the radio resource, or may cascade, in an order of the virtual resource blocks, the physical resource blocks corresponding to all of the predetermined quantity of the virtual resource blocks to obtain the radio resource.

Optionally, when determining the virtual resource blocks, the base station may extract, in ascending or descending order of virtual resource block numbers, M virtual resource blocks starting from a predetermined location. The predetermined location may be a location of any one of the virtual resource blocks, 1≤M≤N, and N is a quantity of distributed virtual resource blocks. There may be one or more predetermined locations. When there are a plurality of predetermined locations, the base station may extract the M virtual resource blocks starting from each predetermined location. Both the predetermined location and a value of M may be determined according to a protocol or delivered by a network side device; or one of the predetermined location and the value of M may be delivered by the network side device, and the other is determined according to the protocol. For example, the base station may extract distributed virtual resource blocks numbered from 0 to M, or may extract distributed virtual resource blocks numbered from N−1 to N−M, or may extract distributed virtual resource blocks numbered from K to K+M−1, where K is a positive integer, 0≤K<N, 1≤M≤N−K, and a quantity of distributed virtual resource blocks is N−1. Both the value of M and a value of K may be delivered by the network side device.

Optionally, when the virtual resource blocks are corresponding to a plurality of interleaving units, the base station may extract at least one virtual resource block from each interleaving unit. When extracting the virtual resource block from the interleaving unit, the base station may extract, in ascending or descending order of virtual resource block numbers, M virtual resource blocks starting from a predetermined location of each interleaving unit. For example, when extracting the virtual resource block from the interleaving unit, the base station may extract, in ascending or descending order of the virtual resource block numbers, the M virtual resource blocks starting from the predetermined location of the interleaving unit. Similarly, 1≤M≤N, and N is a quantity of distributed virtual resource blocks included in the interleaving unit. Both the predetermined location and a value of M may be determined according to a protocol or delivered by a network side device; or one of the predetermined location and the value of M may be delivered by the network side device, and the other is determined according to the protocol.

It should be noted herein that, the base station may determine only a predetermined quantity of localized virtual resource blocks, or may determine only a predetermined quantity of distributed virtual resource blocks, or may determine both a predetermined quantity of localized virtual resource blocks and a predetermined quantity of distributed virtual resource blocks. After extracting the virtual resource blocks, the base station may first determine physical resource blocks corresponding to all of the virtual resource blocks, and cascade, in an order of the virtual resource blocks, the physical resource blocks corresponding to all of the virtual resource blocks.

For example, when extracted virtual resource blocks are a virtual resource block 0 to a virtual resource block 3, and the virtual resource block 0 to the virtual resource block 3 are respectively corresponding to a physical resource block 10, a physical resource block 7, a physical resource block 4, and a physical resource block 1, the base station may sequentially cascade the physical resource block 10, the physical resource block 7, the physical resource block 4, and the physical resource block 1, to obtain the radio resource.

Step 102: Send control information in a first time period by using the radio resource.

When the control information is corresponding to only one terminal, the base station may directly send the control information in the first time period by using the radio resource.

When the control information includes a plurality of pieces of sub-information, the base station may send the control information in the first time period in a no-interleaving manner or send the control information in the first time period in an interleaving manner.

When the control information is sent in the no-interleaving manner, if the control information includes one or more pieces of sub-information, the radio resource is divided into a predetermined quantity of sub-resources, and each sub-resource is constituted by a resource element group extracted from the physical resource block included in the radio resource. The predetermined quantity is greater than or equal to a quantity of the plurality of pieces of sub-information. In the first time period, one of the predetermined quantity of sub-resources is used to send one of the plurality of pieces of sub-information.

An amount of data that can be transmitted by using the physical resource block may not be equal to an amount of data included in the sub-information. Therefore, when the control information is sent in the no-interleaving manner, the base station may also first divide the radio resource into a predetermined quantity of sub-resources, and then send a piece of sub-information in the first time period by using each sub-resource. Each sub-resource is constituted by a resource element group (resource element group, REG for short) extracted from the physical resource block included in the radio resource. A quantity of REGs included in each sub-resource may be determined according to a requirement. In addition, the REGs included in each sub-resource may belong to a same physical resource block or different physical resource blocks. The sub-resource may include REGs extracted from all physical resource blocks of the radio resource, or may include REGs extracted from some physical resource blocks of the radio resource.

Figure 9:
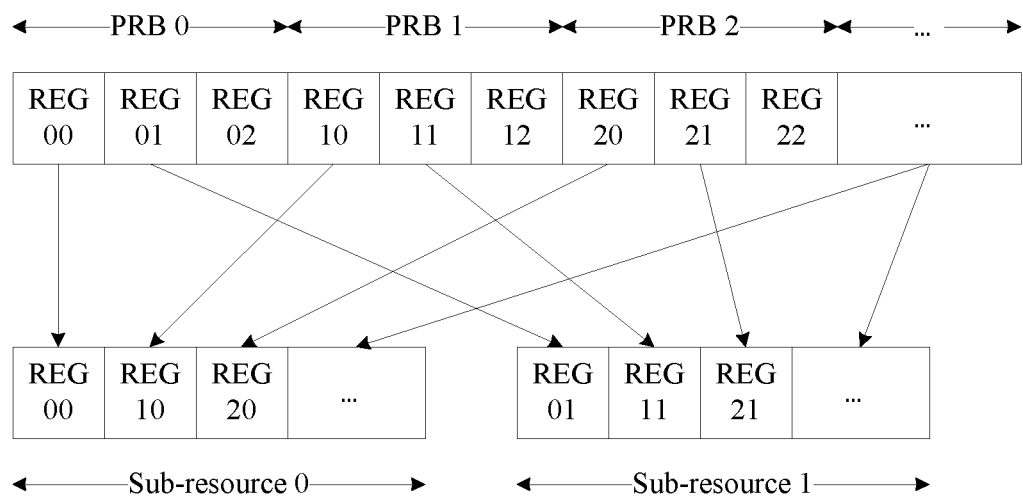
FIG. 9 is a schematic diagram of a manner of determining a sub-resource according to an embodiment of this application.

For example, as shown in FIG. 9, when the radio resource includes sub-resources such as a sub-resource 0 and a sub-resource 1, the sub-resource 0 may include an REG 00 extracted from a physical resource block 0, an REG 10 extracted from a physical resource block 1, an REG 20 extracted from a physical resource block 2, and the like; and the sub-resource 1 may include an REG 01 extracted from the physical resource block 0, an REG 11 extracted from the physical resource block 1, an REG 21 extracted from the physical resource block 2, and the like.

Figure 10:
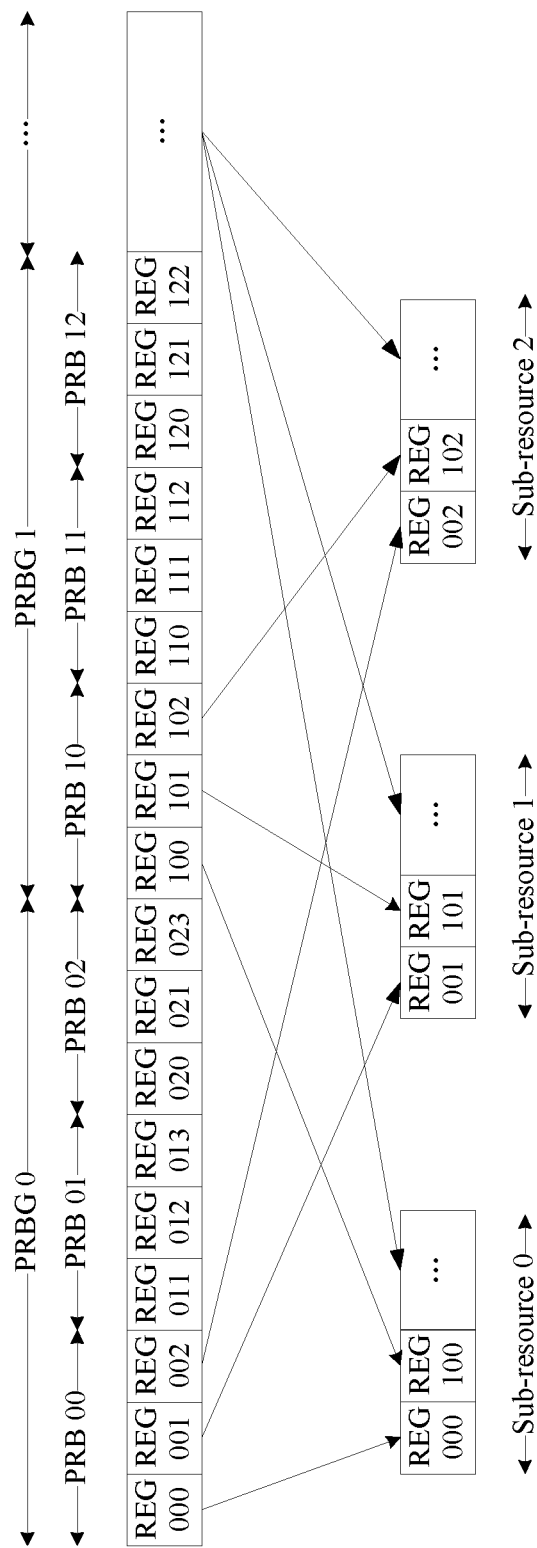
FIG. 10 is another schematic diagram of a manner of determining a sub-resource according to an embodiment of this application.

For another example, as shown in FIG. 10, when the radio resource includes sub-resources such as a sub-resource 0, a sub-resource 1, and a sub-resource 2, the sub-resource 0 may include an REG 000 extracted from a physical resource block 00, an REG 100 extracted from a physical resource block 10, and the like; the sub-resource 1 may include an REG 001 extracted from the physical resource block 00, an REG 101 extracted from the physical resource block 10, and the like; and the sub-resource 2 may include an REG 002 extracted from the physical resource block 00, an REG 102 extracted from the physical resource block 10, and the like.

When the control information is sent in the interleaving manner, the base station may generate an interleaved constellation point symbol stream based on the control information, and map the interleaved constellation point symbol stream onto the radio resource for sending in the first time period.

When generating the interleaved constellation point symbol stream based on the control information, the base station may first generate an information sequence, then perform scrambling and modulation on the information sequence to obtain a constellation point symbol stream, and then perform interleaving on the constellation point symbol stream to obtain the interleaved constellation point symbol stream. When the control information includes a plurality of pieces of sub-information, the information sequence may be obtained by cascading the sub-information. To make the information sequence corresponding to the radio resource, when a data amount of the control information is exactly equal to a data amount that can be transmitted by using the radio resource, a cascade sequence obtained by cascading the sub-information may be used as the information sequence. When the data amount of the control information is less than the data amount that can be transmitted by using the radio resource, a predetermined quantity of nil (nil) elements may be added to an end of the cascade sequence, to obtain the information sequence.

For example, the base station may cascade bit block streams of the plurality of pieces of sub-information to obtain the cascade sequence; add a predetermined quantity of nil elements to an end of the cascade sequence to obtain an information sequence b(n), where n=0,1, . . . ,$M_{tot}$−1; and then sequentially perform scrambling and modulation on the where information sequence b(n) to obtain a constellation point symbol stream d(m), where $$m = 0, 1, \ldots , \frac{M_{tot}}{M_{mod}} - 1.$$

A value of $M_{mod}$ may be determined based on a modulation method used for performing modulation on the information sequence b(n). When quadrature phase shift keying (quadrature phase shift keying, QPSK) is used to perform modulation on the information sequence, the value of $M_{mod}$ may be 2. When 16 quadrature amplitude modulation (16 quadrature amplitude modulation, 16 QAM) is used to perform modulation on the information sequence, the value of $M_{mod}$ may be 4. When 64 quadrature amplitude modulation (64 quadrature amplitude modulation, 64 QAM) is used to perform modulation on the information sequence, the value of $M_{mod}$ may be 6. After the constellation point symbol stream d(m) is generated, the base station may perform interleaving on the constellation point symbol stream d(m) to obtain an interleaved constellation point symbol stream d'(m).

The radio resource may be extracted in a plurality of manners. Therefore, before sending the control information by using the radio resource, the base station may further pre-generate and send indication information to the terminal. The indication information is used to indicate a distribution location of the radio resource. In this case, after receiving the indication information, the terminal may determine the distribution location of the radio resource based on the indication information, and then receive, by using the radio resource, the control information sent by the base station.

Depending on different time granularities at which the distribution location of the radio resource changes, the sent indication information may indicate the distribution location in different manners. The base station may send the indication information in the first time period of each TTI by using a predetermined resource; or the base station may send the indication information on a control channel by using common downlink control information (downlink control information, DCI); or the base station may send the indication information by using higher layer signaling. The indication information may be used to indicate the distribution location of the radio resource on the downlink transmission bandwidth.

Further, the indication information may be further used to indicate that the control information is not sent in the first time period, so that the terminal does not detect the control information, thereby implementing power saving.

Specifically, one of a plurality of patterns indicated by the indication information may be used to indicate that the control information is not sent in the first time period, and other patterns are used to indicate different distribution manners of the control channel in the first time period. Alternatively, two or more patterns indicated by the indication information may be used to indicate that the control information is not sent in the first time period, and other patterns are used to indicate different distribution manners of the control channel in the first time period, and further some patterns may be reserved and are not used to indicate that the control information is not sent in the first time period or indicate different distribution manners of the control channel in the first time period. For example, the indication information includes three bits (bit). 000 may be used to indicate that the control information is not sent in the first time period, and the other seven patterns such as 001 and 010 may be used to indicate seven location distribution manners of the control channel in the first time period, such as an occupied resource amount of the control channel resource and whether the control channel uses a distributed manner or a localized manner. Specially, one or several of the seven patterns except the pattern 000 may also be reserved, that is, there are less than seven location distribution manners. A person skilled in the art should understand that, 3-bit indication information is merely used as an example herein, and the indication information should not be limited to the 3-bit indication information. In actual application, the indication information may be 4-bit indication information or 5-bit indication information, or may be in another similar form.

Specific content of the indication information may also vary according to different specific manners of extracting the radio resource by the base station from the preset resource block set. When the base station extracts the physical resource block in a manner shown in FIG. 2, the indication information may be used to indicate the value of M. When the base station extracts the physical resource block in a manner shown in FIG. 3, the indication information may be used to indicate the value of M, a value of X, or both the value of M and the value of X. When the DCI is used to indicate the value of M, the value of X may be specified in advance by a protocol or may be indicated by the base station in another manner. When the DCI is used to indicate the value of X, the value of M may be specified in advance by a protocol or may be indicated by the base station in another manner.

When the radio resource is constituted by the physical resource block corresponding to the predetermined quantity of virtual resource blocks, the indication information may be used to indicate a number of a virtual resource block used as the predetermined location and the value of M. When the virtual resource blocks are corresponding to a plurality of interleaving units, the indication information may be further used to indicate a specific interleaving unit from which a virtual resource block is obtained.

In addition, the indication information may also be used to indicate a cascade manner used for cascading the available resources, or a cascade manner used for cascading the physical resource blocks corresponding to the virtual resource blocks.

According to this embodiment, the base station may send the control information in any symbol, so that an end-to-end latency in data transmission can be greatly reduced.

In a TTI, in addition to sending the user data information in a second time period later than the first time period, the base station may also send the user data information in the first time period. When sending the user data information in the first time period, the base station may use a radio resource in the downlink transmission bandwidth other than the radio resource used to send the control information to send the user data information.

For example, the base station may determine, based on the control information, a first sending resource used to send the user data information; and send the user data information by using a radio resource, which can be used to send first control information and is not occupied by the first control information, in the first sending resource, without using a radio resource, which can be used to send second control information, in the first sending resource. The first sending resource is a radio resource used to send downlink user data information. The first control information is control information used to schedule the downlink user data information. The second control information is control information used to schedule uplink user data information.

When the downlink transmission bandwidth is divided into several subbands, if the base station sends the control information by using a physical resource block in a subband, the base station may send the user data information by using another physical resource block in the subband or a physical resource block included in a subband adjacent to the subband.

In addition to sending the control information by using the radio resource, the base station may also send the user data information by using the radio resource. For example, when the physical resource block occupied for sending the control information belongs to a first subband, the first subband is used to transmit the user data information corresponding to the control information, or the first subband and a subband adjacent to the first subband are used to transmit the user data information corresponding to the control information.

Specifically, when the control information includes uplink scheduling control information and downlink scheduling control information, the radio resource may include two parts: a radio resource that is used to send the uplink scheduling control information, and a radio resource that is used to send the downlink scheduling control information. When a data amount of the downlink scheduling control information is relatively small, and is less than a data amount that can be transmitted by using the radio resource that is used to send the downlink scheduling control information, the base station may send the user data information by using a radio resource, which can be used to send the downlink scheduling control information and is not occupied by the downlink scheduling control information, in the radio resource. It should be noted herein that, to avoid a conflict, even though not all the radio resources that is used to send the uplink scheduling control information are occupied, the base station usually cannot use the radio resource that is used to send the uplink scheduling control information to send the user data information.

Figure 11:
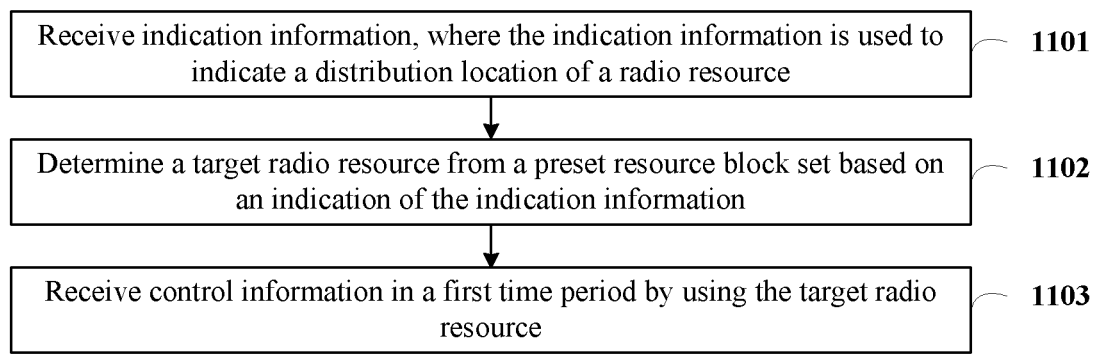
FIG. 11 is another flowchart of a control information transmission method according to an embodiment of this application.

Referring to FIG. 11, FIG. 11 is a schematic flowchart of another embodiment of a control information transmission method according to this application. The method described in this embodiment can be executed by a terminal.

Step 1101: Receive indication information, where the indication information is used to indicate a distribution location of a radio resource.

The terminal may receive the indication information according to a predetermined rule. The indication information is used to indicate the distribution location of the radio resource. For a delivering manner and specific content of the indication information, refer to the foregoing embodiments. Details are not described herein again.

Step 1102: Determine a target radio resource from a preset resource block set based on an indication of the indication information.

The terminal may extract the target radio resource from the resource block set according to a predetermined extraction rule. The predetermined extraction rule may be pre-stored in a terminal; or the predetermined extraction rule may be sent to the terminal by a base station by using the indication information; or a part of the predetermined extraction rule may be stored in the terminal, and a part of the predetermined extraction rule is sent to the terminal by the base station by using the indication information.

Optionally, the terminal may receive the indication information, where the indication information is used to indicate a distribution location of the target radio resource; and determine the target radio resource from the preset resource block set based on an indication of the indication information.

The terminal may determine, depending on different extraction rules, the target radio resource depending on different content indicated by the indication information.

Optionally, the terminal may extract a specified quantity of physical resource blocks from a downlink transmission bandwidth based on the location indicated by the indication information, and cascade the physical resource blocks in a cascade manner indicated by the indication information, to obtain the target radio resource. The location and the specified quantity may be preset or are indicated by the indication information. The indication information may be used to indicate only the specified quantity, and the location may be determined by the terminal according to the predetermined rule stored in the terminal; or the indication information may be used to indicate only the location, and the specified quantity may be determined by the terminal according to the preset rule stored in the terminal; or the indication information may be used to indicate both the specified quantity and the location.

Optionally, the terminal may alternatively extract, based on the location indicated by the indication information, a predetermined quantity of virtual resource blocks from a plurality of virtual resource blocks included in the resource block set; and determine a physical resource corresponding to the predetermined quantity of the virtual resource blocks as the target radio resource. A location of the virtual resource block and a quantity of virtual resource blocks may also be preset or indicated by the indication information.

For a specific manner of extracting the specified quantity of physical resource blocks from the downlink transmission bandwidth and a specific cascade manner of cascading the physical resource blocks to obtain the target radio resource, refer to the foregoing embodiments, for example, specific manners corresponding to FIG. 3 to FIG. 10. Details are not described herein again. Similarly, for a specific manner of extracting the predetermined quantity of virtual resource blocks and a specific manner of determining the target radio resource based on the physical resource corresponding to the virtual resource blocks, refer to the foregoing embodiments. Details are not described herein again.

Step 1103: Receive control information in a first time period by using the target radio resource.

After determining the target radio resource, the terminal may receive the control information in the first time period by using the target radio resource.

Optionally, the method may further include the following step.

Step 1104: The indication information is further used to indicate that the control information is not sent in the first time period; and when the currently received indication information indicates that the control information is not sent in the first time period, no detection is performed in the first time period on the control information carried on a radio resource. In other words, when the indication information indicates that the control information is not sent in the first time period, the terminal may not detect the control information, thereby implementing power saving.

For example, one of a plurality of patterns indicated by the indication information may be used to indicate that the control information is not sent in the first time period, other patterns are used to indicate a distribution location of a control channel in the first time period, or further, some patterns may be reserved and not used. For example, the indication information has three bits. 000 may be used to indicate that the control information is not sent in the first time period, and the other seven patterns such as 001 and 010 may be used to indicate seven location distribution manners of the control channel in the first time period, such as a control channel resource amount and whether the control channel uses a distributed manner or a localized manner. If the currently received indication information is 000, the terminal does not need to detect, in the first time period, whether the radio resource carries the control information. Specially, one or several of the seven patterns except the pattern 000 may also be reserved, that is, there are less than seven location distribution manners.

When the control information is corresponding only to the terminal, the terminal may receive all content of the control information. When the control information includes at least one piece of sub-information, and only several pieces of sub-information are corresponding to the terminal, and the other sub-information is corresponding to another terminal, the terminal may receive the sub-information of the terminal by using the target radio resource.

When receiving the control information by using the target radio resource, the terminal may first determine a common search space in the target radio resource, and receive the sub-information of the terminal by performing blind detection on the common search space. The common search space may start from a minimum-index resource in the target radio resource or a maximum-index resource in the target radio resource. The common search space may occupy X physical resource blocks. A value of X may be specified in advance by a protocol or delivered by using higher layer signaling. Generally, $1 \leq X \leq K$, both X and K are positive integers, and K is a quantity of physical resource blocks included in the target radio resource.

When receiving the control information by using the target radio resource, the terminal may alternatively first determine a UE-specific search space in the target radio resource, and receive the sub-information of the terminal by performing blind detection on the UE-specific search space. The UE-specific search space is Y consecutive resource blocks starting from a start resource block corresponding to the terminal in the target radio resource. The start resource block may be an $a^{th}$ resource block of the target radio resource. A value of a may be obtained by the terminal based on a UE ID of the terminal. A value of Y is a positive integer, and may be specified in advance by a protocol or delivered by using higher layer signaling. Generally, $1 \leq Y \leq K$, and K indicates a quantity of physical resource blocks included in the target radio resource.

The base station may send user data information in the first time period. Therefore, in addition to receiving the control information, the terminal may further receive, in the first time period, the user data information scheduled by using the control information. In the first time period, in addition to sending the control information by using the target radio resource, the base station may further send the user data information by using the target radio resource. Therefore, in the first time period and a second time period, the terminal may further receive the user data information scheduled by using the control information.

Usually, when using a physical resource block in a subband to send the control information, the base station may use another physical resource block in the subband to send the user data information, or may use a physical resource block included in a subband adjacent to the subband to send the user data information, or may use both another physical resource block in the subband and a physical resource block included in a subband adjacent to the subband to send the user data information. Therefore, the terminal may further receive the user data information on the subband to which the radio resource used to send the control information belongs; or receive the user data information on the subband to which the radio resource used to send the control information belongs and an adjacent subband.

The base station may further send the user data information by using a radio resource, which can be used to send downlink scheduling control information and is not occupied by the downlink scheduling control information, in the radio resource. Therefore, when the control information includes uplink scheduling control information and the downlink scheduling control information, the terminal may further determine, based on the control information, a first sending resource used to send the user data information; and receive the user data information by using a radio resource, which can be used to send the downlink scheduling control information and is not occupied by the downlink scheduling control information, in the first sending resource, without using a radio resource, which can be used to send the uplink scheduling control information, in the first sending resource.

According to this embodiment, the terminal can receive control information that is sent in any symbol by the base station, so that an end-to-end latency in data transmission can be greatly reduced.

Figure 12:
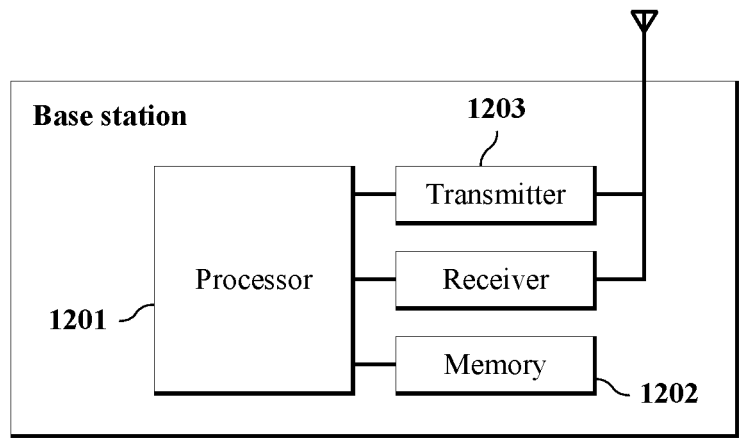
FIG. 12 is a schematic structural diagram of a base station according to an embodiment of this application.

Referring to FIG. 12, FIG. 12 is a schematic structural diagram of an embodiment of a base station according to this application. The base station may include a NodeB, an eNodeB, or the like. The base station may be configured to execute the data transmission method in the embodiment corresponding to FIG. 1.

As shown in FIG. 12, the base station may include components such as a processor 1201, a memory 1202, and a transmitter 1203. These components are connected and perform communication by using one or more buses.

The processor 1201 is a control center of the base station, connects various parts of the entire base station by using various interfaces and lines, and runs or executes a software program and/or a module stored in the memory 1202 and invokes data stored in the memory 1202, to perform various functions of the base station and/or process data. The processor 1201 may include an integrated circuit (integrated circuit, IC for short), for example, may include a single packaged IC, or may be formed by connecting a plurality of packaged ICs having a same function or different functions. For example, the processor 1201 may be a communication processor (CP).

The memory 1202 may be configured to store the software program and the module, and the processor 1201 executes various function applications of the base station and implements data processing by running the software program and the module stored in the memory 1202. In a specific implementation of this application, the memory 1202 may include a volatile memory such as a nonvolatile random access memory (NVRAM), a phase change random access memory (PRAM), and a magnetoresistive random access memory (MRAM). The memory 1202 may further include a nonvolatile memory such as at least one disk storage device, an electrically erasable programmable read-only memory (EEPROM), and a flash memory such as a NOR flash memory or a NAND flash memory.

The transmitter 1203 is configured to establish a communication channel, so that the base station can send data to a terminal by using the communication channel. The transmitter 1203 may include a transmitter (transmitter) and a radio frequency (radio frequency, RF for short) circuit corresponding to the transmitter. In different implementations of this application, various communications modules in the transmitter 1203 are usually presented in a form of an integrated circuit chip (integrated circuit chip), and may be selectively combined without including all the communications modules and corresponding antenna groups.

Corresponding to the control information transmission method in FIG. 1, in an optional implementation, the processor 1201 is configured to extract a radio resource from a preset resource block set. The transmitter 1203 is configured to send control information in a first time period by using the radio resource.

Optionally, the resource block set includes a plurality of physical resource blocks corresponding to a downlink transmission bandwidth. The processor 1201 is specifically configured to extract at least one physical resource block from the plurality of physical resource blocks corresponding to the downlink transmission bandwidth; and determine the radio resource based on the at least one physical resource block.

When extracting the at least one physical resource block from the plurality of physical resource blocks corresponding the downlink transmission bandwidth, the processor 1201 may be further configured to separately extract a group of available resources from two ends of the plurality of physical resource blocks corresponding to the downlink transmission bandwidth. Each group of available resources includes at least one physical resource block.

If the downlink transmission bandwidth includes at least one available subband that is used to send the control information, when extracting the at least one physical resource block from the plurality of physical resource blocks corresponding the downlink transmission bandwidth, the processor 1201 may be further configured to separately extract a group of available resources from at least some of the available subband. Each group of available resources includes at least one physical resource block.

Optionally, when the processor 1201 determines the radio resource based on the physical resource block, if the control information is corresponding to one terminal, the processor 1201 may be further configured to use the physical resource block as the radio resource.

Optionally, when determining the radio resource based on the physical resource block, the processor 1201 may sequentially cascade, in a frequency order, physical resource blocks included in the groups of available resources to obtain the radio resource.

Optionally, when determining the radio resource based on the physical resource block, the processor 1201 may sequentially extract physical resource blocks from the groups of available resources, and sequentially cascade the physical resource blocks to obtain the radio resource. When there are two groups of available radio resource, the processor 1201 may extract a physical resource block alternately from the two groups of available resources, and cascade extracted physical resource blocks to obtain the radio resource. The physical resource blocks are extracted from one group of available resources in descending order of frequency, and are extracted from the other group of available resources in ascending order of frequency.

Optionally, when extracting the radio resource from the preset resource block set, the processor 1201 may first extract a predetermined quantity of virtual resource blocks, and then determine the radio resource based on a physical resource corresponding to the virtual resource blocks.

Optionally, when extracting the predetermined quantity of virtual resource blocks, the processor 1201 may extract, starting from a predetermined location in ascending or descending order of virtual resource block numbers, M virtual resource blocks. When the virtual resource blocks in the resource block set are corresponding to a plurality of interleaving units, the processor 1201 may also extract at least one virtual resource block from each interleaving unit. For example, the processor 1201 may extract, starting from a predetermined location of each interleaving unit in ascending or descending order of virtual resource block numbers, the M virtual resource blocks.

Optionally, when determining the radio resource based on the physical resource corresponding to the virtual resource block, the processor 1201 may first determine, based on a mapping relationship between a virtual resource block in the resource block set and a physical resource block in the resource block set, physical resource blocks corresponding to all of the predetermined quantity of the virtual resource blocks; and then cascade, in an order of the virtual resource blocks, the physical resource blocks corresponding to all of the predetermined quantity of the virtual resource blocks to obtain the radio resource.

Optionally, when the control information includes a plurality of pieces of sub-information, the processor 1201 may control the transmitter 1203 to send one piece of sub-information by using one physical resource block. In other words, the transmitter is configured to send the control information in the first time period by using the radio resource.

Optionally, when the control information includes a plurality of pieces of sub-information, the processor 1201 may divide the radio resource into a predetermined quantity of sub-resources. Each sub-resource is constituted by an REG extracted from the physical resource block included in the radio resource. The processor 1201 may control the transmitter 1203 to send, by using each sub-resource in the first time period, one piece of sub-information corresponding to the sub-resource. Each piece of sub-information is corresponding to one terminal. That is, the sub-resource is in a one-to-one correspondence with the sub-information. In other words, the transmitter is further configured to send one piece of sub-information in the first time period by using each sub-resource, where each piece of sub-information is corresponding to one terminal.

Optionally, the processor 1201 may generate an information sequence, where the information sequence includes the control information; perform scrambling and modulation on the information sequence to obtain a constellation point symbol stream; and perform interleaving on the constellation point symbol stream to obtain an interleaved constellation point symbol stream. The transmitter 1203 may further map the interleaved constellation point symbol stream onto the radio resource for sending in the first time period.

Optionally, the processor 1201 may be further configured to control the transmitter 1203 to send indication information, where the indication information is used to indicate a distribution location of the radio resource.

The processor 1201 controls the transmitter 1203 to send the indication information in a first time period of at least one TTI by using a predetermined resource, where the indication information is used to instruct the terminal to determine the distribution location of the radio resource; or may control the transmitter 1203 to send common downlink control information DCI on a control channel in a first time period of at least one TTI, where the common DCI is used to instruct the terminal to determine the distribution location of the radio resource; or may control the transmitter 1203 to send the indication information by using higher layer signaling in a first time period of at least one TTI, where the indication information is used to instruct the terminal to determine the distribution location of the radio resource. Usually, the processor 1201 may control the transmitter 1203 to send, in the first time period of each TTI, the indication information, the DCI, or the higher layer signaling used to indicate the indication information. Further, the indication information may be further used to instruct the terminal that the transmitter 1203 does not send the control information in the first time period, so that the terminal may not detect the control information in the first time period, thereby implementing power saving.

The processor 1201 may further control the transmitter 1203 to send, in the first time period or in a second time period later than the first time period, user data information scheduled by using the control information.

The processor 1201 may be configured to control the transmitter 1203 to transmit the user data information of the terminal by using a subband to which the radio resource belongs, or control the transmitter 1203 to transmit the user data information of the terminal by using a subband to which the radio resource belongs and a subband adjacent to the subband to which the radio resource belongs. When the user data information is sent, if the control information includes uplink scheduling control information and downlink scheduling control information, the processor 1201 may control the transmitter 1203 to send the user data information by using a radio resource, which can be used to send the downlink scheduling control information and that is not occupied by the downlink scheduling control information, in the radio resource.

Figure 13:
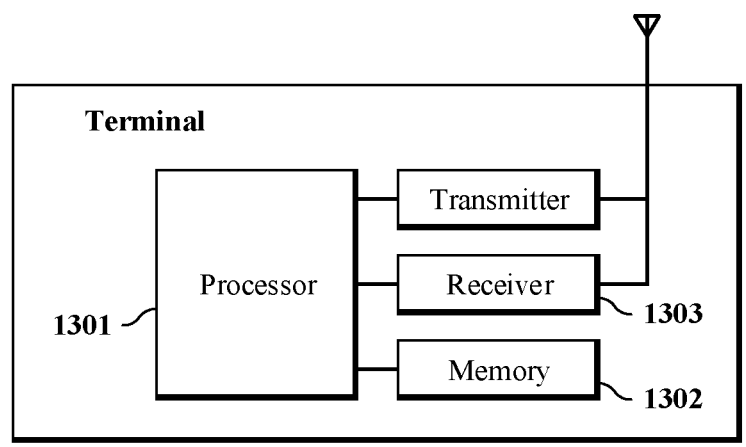
FIG. 13 is a schematic structural diagram of a terminal according to an embodiment of this application.

Referring to FIG. 13, FIG. 13 is a schematic structural diagram of an embodiment of a terminal according to this application. The terminal may include a mobile station, UE, or the like.

As shown in FIG. 13, the terminal may include components such as a processor 1301, a memory 1302, and a receiver 1303. In addition, these components are connected and perform communication by using one or more buses.

The processor 1301 is a control center of the terminal, connects various parts of the entire terminal by using various interfaces and lines, and runs or executes a software program and/or a module stored in the memory 1302 and invokes data stored in the memory 1302, to perform various functions of the terminal and/or process data. The processor 1301 may include an integrated circuit (IC), for example, may include a single packaged IC, or may be formed by connecting a plurality of packaged ICs having a same function or different functions. For example, the processor 1301 may be a CP.

The receiver 1303 is configured to establish a communication channel, so that the terminal receives, by using the communication channel, data sent by a base station. The receiver 1303 may include a receiver (receiver) and a radio frequency circuit corresponding to the receiver, and is configured to perform communication in a cellular communications system, such as in a Wideband Code Division Multiple Access (W-CDMA) system and/or in a High Speed Downlink Packet Access (HSDPA) system. In different implementations of this application, various communications modules in the receiver 1303 are usually presented in a form of an integrated circuit chip (Integrated Circuit Chip), and may be selectively combined without including all the communications modules and corresponding antenna groups. For example, the receiver 1303 may include only a radio frequency chip and a corresponding antenna, to provide a communication function in a cellular communications system.

In some optional implementations of this application, the receivers in the receiver 1303 such as a baseband module may be integrated into the processor 1301. A typical example of the baseband module is a mobile data modem (Mobile Data Modem, MDM for short) provided by Qualcomm (Qualcomm). The radio frequency circuit is configured to receive and send information or receive and send a signal during a call. For example, after receiving downlink information sent by the base station, the radio frequency circuit sends the downlink information to the processor 1301 for processing, and sends uplink related data to the base station. Usually, the radio frequency circuit includes a known circuit configured to perform these functions, including but not limited to an antenna system, a radio frequency transceiver, one or more amplifiers, a tuner, one or more oscillators, a digital signal processor, a codec (Codec) chipset, a subscriber identity module (SIM) card, the memory 1302, and the like. In addition, the radio frequency circuit may further bidirectionally communicate with a network and another device through radio communication. Any communications standard or protocol may be used for the radio communication, including but not limited to GSM (Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), High Speed Uplink Packet Access (High Speed Uplink Packet Access, HSUPA), LTE (Long Term Evolution, Long Term Evolution), an email protocol, and an SMS (short message service) protocol.

The memory 1302 may be configured to store the software program and the module, and the processor 1301 executes various function applications of the terminal and implements data processing by running the software program and the module stored in the memory 1302. The memory 1302 mainly includes a program storage area and a data storage area. The program storage area may store an operating system and an application program, such as a sound player program or an image player program, required by at least one function. The data storage area may store data (such as audio data and a phone book) and the like that are created based on usage of the terminal. In a specific implementation of this application, the memory 1302 may include a volatile memory such as a nonvolatile random access memory (NVRAM), a phase change random access memory (Phase Change RAM, PRAM for short), and a magnetoresistive random access memory (magnetoresistive RAM, MRAM for short). The memory 1302 may further include a nonvolatile memory such as at least one disk storage device, an electrically erasable programmable read-only memory (Electrically Erasable Programmable Read-Only Memory, EEPROM for short), and a flash memory such as a NOR flash memory (NOR flash memory) or a NAND flash memory (NAND flash memory). The nonvolatile memory stores an operating system and an application program that are executed by the processor 1301. The processor 1301 loads, from the nonvolatile memory, a running program and data to the memory, and stores digital content into a large-capacity storage apparatus. The operating system includes various components and/or drivers that are used to control and management normal system tasks such as memory management, storage device control, and power management, and that facilitate communication between software and hardware. In this implementation of this application, the operating system may be an Android system of Google, an iOS system developed by Apple, a Windows operating system developed by Microsoft, or an embedded operating system such as VxWorks.

Corresponding to the method in FIG. 10, in this embodiment of this application, the processor 1301 is configured to extract, from a resource block set according to a predetermined extraction rule, a radio resource used to transmit control information in a first time period. The receiver 1303 is configured to receive, based on the radio resource, the control information transmitted by the base station in the first time period.

Optionally, the receiver 1303 may be further configured to receive indication information transmitted by the base station. The processor 1301 determines a target radio resource from the preset resource block set based on an indication of the indication information. The receiver 1303 may be further configured to receive the control information in the first time period by using the target radio resource.

Optionally, when determining the radio resource in a manner indicated by the indication information, the processor 1301 may extract a specified quantity of physical resource blocks from a downlink transmission bandwidth based on a location indicated by the indication information; and cascade the physical resource blocks in a cascade manner indicated by the indication information, to obtain the radio resource.

Optionally, when determining the radio resource in a manner indicated by the indication information, the processor 1301 may also extract, based on a location indicated by the indication information, a predetermined quantity of virtual resource blocks from a plurality of virtual resource blocks included in the resource block set; and determine a physical resource corresponding to the predetermined quantity of the virtual resource blocks as the radio resource.

Optionally, when the indication information indicates that the control information is not sent in the first time period, the processor 1301 may perform no detection on the control information based on the indication information, thereby implementing power saving.

Optionally, the processor 1301 may further first determine a common search space in the target radio resource, and then receive control information of the terminal by performing blind detection on the common search space. The common search space is X consecutive physical resource blocks starting from a minimum-index resource or a maximum-index resource in the target radio resource, where X is a positive integer not less than 1.

Optionally, the processor 1301 may further first determine a UE-specific search space in the target radio resource, and then receive control information of the terminal by performing blind detection on the UE-specific search space. The UE-specific search space is Y consecutive resource blocks starting from an $a^{th}$ resource block of the target radio resource, where a is obtained based on a UE ID, and Y is a positive integer not less than 1.

In addition to receiving the control information by using the receiver 1303, the processor 1301 may further receive user data information by using the receiver 1303.

Optionally, the processor 1301 may receive, by using the receiver 1303, the user data information transmitted by using a subband to which the radio resource belongs; or may receive, by using the receiver 1303, the user data information transmitted by using a subband to which the radio resource belongs and a subband adjacent to the subband to which the radio resource belongs.

Optionally, when the control information includes uplink scheduling control information and downlink scheduling control information, the processor 1301 may receive, by using the receiver 1303, the user data information transmitted by using a radio resource, which can be used to transmit the downlink scheduling control information and is not occupied by the downlink scheduling control information, in the radio resource.

In specific implementation, this application further provides a computer storage medium, where the computer storage medium may store a program. When the program is executed, some or all of the steps of the embodiments of the control information transmission method provided in this application may be performed. The storage medium may be a magnetic disk, an optical disc, a read-only memory (read-only memory, ROM), a random access memory (random access memory, RAM), or the like.

A person skilled in the art may clearly understand that, the technologies in the embodiments of this application may be implemented by software in combination with a necessary general hardware platform. Based on such an understanding, the technical solutions of this application essentially or the part contributing to the prior art may be implemented in a form of a software product. The computer software product may be stored in a storage medium, such as a ROM/RAM, a hard disk, or an optical disc, and include several instructions for instructing a computer device (which may be a personal computer, a server, a network device, or the like) to execute the methods described in the embodiments or some parts of the embodiments of this application.

Reference may be made between same or similar content in the embodiments of this specification. Particularly, for related content in the apparatus, base station, and terminal embodiments, refer to descriptions of the method embodiments.

The foregoing descriptions are implementations of this application, but are not intended to limit the protection scope of this application.

What is claimed is:

1. A communication method comprising:
receiving indication information, wherein the indication information is used to indicate a distribution location of a target radio resource;
determining the target radio resource from a preset resource block set based on the indication information;
determining, as a UE-specific search space, Y consecutive resource blocks starting from an $a^{th}$ resource block in the target radio resource, wherein a is based on a terminal identity, a is a natural number, and Y is a positive integer not less than 1;
receiving, in a first time period, control information by performing blind detection on the UE-specific search space in the target radio resource; and
receiving user data information by using a second radio resource and without using a third radio resource,
wherein a first radio resource, indicated by the control information, comprises the second and third radio resources, and
wherein the second radio resource can be used to carry first scheduling control information and is not occupied by the first scheduling control information, and the third radio resource can be used to carry second scheduling control information.

2. The method according to claim 1, wherein the resource block set comprises a plurality of physical resource blocks corresponding to a downlink transmission bandwidth, and wherein determining the target radio resource from the preset resource block set based on the indication information comprises:
extracting, based on the indication information, a quantity of physical resource blocks from the plurality of physical resource blocks corresponding to the downlink transmission bandwidth; and
cascading the physical resource blocks in a cascade manner indicated by the indication information, to obtain the target radio resource.

3. An apparatus comprising:
one or more processors; and
a non-transitory storage medium coupled to the one or more processors and configured to store instructions which, when executed by the one or more processors, cause the apparatus to:
receive indication information that indicates a distribution location of a target radio resource;
determine the target radio resource from a preset resource block set based on the indication information;
determine, as a UE-specific search space, Y consecutive resource blocks starting from an $a^{th}$ resource block in the target radio resource, wherein a is based on a terminal identity, a is a natural number, and Y is a positive integer not less than 1;
receive, in a first time period, control information by performing blind detection on the UE-specific search space in the target radio resource; and
receive user data information by using a second radio resource and without using a third radio resource,
wherein a first radio resource, indicated by the control information, comprises the second and third radio resources, and
wherein the second radio resource can be used to carry first scheduling control information and is not occupied by the first scheduling control information, and the third radio resource can be used to carry second scheduling control information.

4. The apparatus according to claim 3, wherein the resource block set comprises a plurality of physical resource blocks corresponding to a downlink transmission bandwidth, and wherein determining the target radio resource from the preset resource block set based on the indication information comprises:
extracting, based on the indication information, a quantity of physical resource blocks from the plurality of physical resource blocks corresponding to the downlink transmission bandwidth; and
cascading the physical resource blocks in a cascade manner, indicated by the indication information, to obtain the target radio resource.

5. An apparatus comprising:
one or more processors; and
a non-transitory storage medium coupled to the one or more processors and configured to store instructions which, when executed by the one or more processors, cause the apparatus to:
determine a target radio resource from a preset resource block set comprising a plurality of physical resource blocks corresponding to a downlink transmission bandwidth;
determine, as a UE-specific search space, Y consecutive resource blocks starting from an $a^{th}$ resource block in the target radio resource, wherein a is based on a terminal identity, a is a natural number, and Y is a positive integer not less than 1;
send, in a first time period, control information on the UE-specific search space in the target radio resource; and
send user data information by using a second radio resource and without using a third radio resource,
wherein a first radio resource, indicated by the control information, comprises the second and third radio resources, and
wherein the second radio resource can be used to carry first scheduling control information and is not occupied by the first scheduling control information, and the third radio resource can be used to carry second scheduling control information.

6. The apparatus according to claim 5, wherein determining the target radio resource from the preset resource block set comprises:
determining at least one physical resource block from the plurality of physical resource blocks corresponding to the downlink transmission bandwidth; and
determining, according to the at least one physical resource block, the target radio resource.

7. The apparatus according to claim 6, wherein determining the at least one physical resource block from the plurality of physical resource blocks corresponding to the downlink transmission bandwidth comprises:
when the downlink transmission bandwidth comprises at least one available subband that is used for the control information, separately extracting a group of available resources from at least some of the at least one available subband.

8. The apparatus according to claim 7, wherein each group of available resources comprises at least one physical resource block.

9. The apparatus according to claim 8, wherein determining, according to the at least one physical resource block, the target radio resource comprises:
sequentially cascading, in a frequency order, physical resource blocks comprised in the groups of available resources to obtain the target radio resource.

10. The apparatus according to claim 8, wherein determining, according to the at least one physical resource block, the target radio resource comprises:
sequentially extracting physical resource blocks from the groups of available resources, and cascade the physical resource blocks to obtain the target radio resource.

11. The apparatus according to claim 5, wherein the non-transitory storage medium is configured to store further instructions which, when executed by the one or more processors, cause the apparatus to:
generate indication information used to indicate a distribution location of the target radio resource; and
send the indication information.

12. The apparatus according to claim 11, wherein sending the indication information comprises sending the indication information by using higher layer signaling.

* * * * *

UNITED STATES PATENT AND TRADEMARK OFFICE
CERTIFICATE OF CORRECTION

| | | |
|---|---|---|
| PATENT NO. | : 11,432,232 B2 | Page 1 of 1 |
| APPLICATION NO. | : 16/054623 | |
| DATED | : August 30, 2022 | |
| INVENTOR(S) | : Jiao et al. | |

It is certified that error appears in the above-identified patent and that said Letters Patent is hereby corrected as shown below:

On the Title Page

Foreign Application Priority Data item (30):
"Feb. 4, 2016 (WO) ................ PCT/CN2016/073546"
Should read:
-- Feb. 4, 2016 (CN) ................ PCT/CN2016/073546 --.

Signed and Sealed this
Seventeenth Day of January, 2023

Katherine Kelly Vidal
*Director of the United States Patent and Trademark Office*